United States Patent
Lee

(10) Patent No.: US 8,786,451 B2
(45) Date of Patent: Jul. 22, 2014

(54) LEAK DETECTION SYSTEM HAVING POWER AND COMMUNICATION LINES

(75) Inventor: Yeu Yong Lee, Seoul (KR)

(73) Assignee: Chang Sung Ace Co., Ltd., Gyeonggi-Do (KR)

( * ) Notice: Subject to any disclaimer, the term of this patent is extended or adjusted under 35 U.S.C. 154(b) by 419 days.

(21) Appl. No.: 13/196,347

(22) Filed: Aug. 2, 2011

(65) Prior Publication Data

US 2012/0032811 A1 Feb. 9, 2012

(30) Foreign Application Priority Data

Aug. 6, 2010 (KR) .................. 10-2010-0075756

(51) Int. Cl.
G08B 21/00 (2006.01)

(52) U.S. Cl.
USPC ............... 340/605; 340/603; 73/40; 137/312

(58) Field of Classification Search
USPC .......... 340/605, 603; 73/40, 40.5 R; 137/312; 702/51
See application file for complete search history.

(56) References Cited

U.S. PATENT DOCUMENTS

| | | | | |
|---|---|---|---|---|
| 4,206,632 A * | 6/1980 | Suzuki | ........................ | 340/605 |
| 4,797,621 A * | 1/1989 | Anderson et al. | ............ | 340/605 |
| 4,910,998 A * | 3/1990 | Willis et al. | ................... | 340/605 |
| 5,159,276 A * | 10/1992 | Reddy, III | ...................... | 340/605 |
| 5,177,996 A * | 1/1993 | Sahakian | ......................... | 73/40 |
| 5,272,646 A * | 12/1993 | Farmer | ......................... | 340/605 |
| 5,334,970 A * | 8/1994 | Bailey | .......................... | 340/506 |
| 5,410,255 A * | 4/1995 | Bailey | .......................... | 324/525 |
| 5,883,815 A * | 3/1999 | Drakulich et al. | ............ | 340/605 |
| 6,526,807 B1 * | 3/2003 | Doumit et al. | ................. | 340/605 |
| 2004/0098212 A1* | 5/2004 | Hong et al. | ..................... | 702/51 |
| 2012/0027927 A1* | 2/2012 | Raymond | ..................... | 427/118 |

FOREIGN PATENT DOCUMENTS

KR 20-0433613 12/2006

* cited by examiner

*Primary Examiner* — Eric M Blount
(74) *Attorney, Agent, or Firm* — IPLA P.A.; James E. Bame

(57) ABSTRACT

A leak detection system having power and communication lines includes a leak sensing cable having sensor lines for sensing a leak, detection controllers connected to the sensor lines to detect a leak position signal, and a master controller receiving the detected leak position signal from the detection controllers, wherein the leak sensing cable includes power and communication lines that are wired to supply power to the detection controllers via the master controller and to transmit the leak position signal to the master controller from the detection controllers. According to this invention, the leak detection system has power and communication lines that are able to transmit the leak position signal between the detection controllers and the master controller while supplying power to the detection controllers and the master controller.

18 Claims, 10 Drawing Sheets

LEAK DETECTION SYSTEM HAVING POWER AND COMMUNICATION LINES

CROSS REFERENCE

This application claims foreign priority under Paris Convention and 35 U.S.C. §119 to Korean Patent Application No. 10-2010-0075756, filed Aug. 6, 2010 with the Korean Intellectual Property Office.

BACKGROUND OF THE INVENTION

1. Technical Field

The present invention relates to a leak detection system, and, more particularly, to a leak detection system having power and communication lines embedded in a leak sensing cable.

2. Description of the Related Art

This invention pertains to a leak detection system.

A conventional leak detection system includes a leak sensing cable having sensor lines for sensing a leak, detection controllers connected to the sensor lines of the leak sensing cable to detect a leak position signal, and a master controller receiving the leak position signal from the detection controllers to process it.

However, the conventional leak detection system is problematic because a power line for supplying power necessary for operating the detection controllers or the master controller has to be additionally provided, and a communication line for transmitting the leak position signal detected by the detection controllers to the master controller also must be additionally provided, undesirably making it difficult to install and manage the leak detection system and increasing the installation cost.

Specifically, the conventional leak detection system is undesirably configured because the power system for supplying power to the detection controllers and the master controller and the communication system for transmitting the leak position signal between the detection controllers and the master controller have to be separately provided.

SUMMARY OF THE INVENTION

Accordingly, the present invention has been made keeping in mind the problems occurring in the related art and an object of the present invention is to provide a leak detection system having power and communication lines, in which a leak sensing cable having sensor lines for sensing a leak position attached to the outer surface thereof further includes the power and communication lines, thereby enabling detection controllers and a master controller to be powered and simultaneously the leak position signal to be transmitted between the detection controllers and the master controller.

Another object of the present invention is to provide a leak detection system having power and communication lines, which is provided in a closed loop or in a series using a leak sensing cable having not only sensor lines but also power and communication lines, whereby the leak detection system having power and communication lines may be easily provided depending on the characteristics of a region that requires the installation of a leak detection system.

A further object of the present invention is to provide a leak detection system having power and communication lines, in which a leak sensing cable having sensor lines for sensing a leak position attached to the outer surface thereof further includes the power and communication lines, and leak amount sensor lines are further attached to the outer surface of the cable to sense the leak amount, thereby enabling detection controllers and a master controller to be powered and simultaneously the leak position signal and the leak amount signal to be transmitted between the detection controllers and the master controller.

In order to accomplish the above objects, an aspect of the present invention provides a leak detection system having power and communication lines, comprising a leak sensing cable having sensor lines for sensing a leak, at least one detection controller connected to the sensor lines to detect a leak position signal, and a master controller receiving the detected leak position signal from the detection controller, wherein the leak sensing cable includes the power and communication lines that are wired to supply power to the detection controller via the master controller and to transmit the leak position signal from the detection controller to the master controller, and a computer for storing the leak position signal received by the master controller and displaying it on a monitor is provided.

In this aspect, the power and communication lines may be embedded in the leak sensing cable and may be connected to the master controller and the detection controller.

In this aspect, the power and communication lines may comprise a positive (+) power and communication line and a negative (−) power and communication line.

In this aspect, the positive power and communication line and the negative power and communication line may be connected to the detection controller using the master controller as a start point and an end point thus forming a closed loop.

In this aspect, the at least one detection controller may comprise two or more detection controllers, and the detection controllers may be respectively connected to the sensor lines.

In this aspect, the sensor lines may comprise two pairs of leak detection lines each pair comprising a single detection line and a single extension line, and one end of each of the detection lines and the extension lines may be connected to the detection controllers, and the other end thereof may be terminated so that the detection lines and the extension lines of respective pairs of leak detection lines are connected to each other.

In this aspect, the leak detection system may further comprise an alarm for informing of reception of the leak position signal by the master controller when the leak position signal is transmitted to the master controller.

In this aspect, the leak sensing cable may further include leak amount sensor lines for sensing a leak amount, the detection controller may be connected to the leak amount sensor lines to further detect a leak amount signal, and the master controller may further receive the detected leak amount signal from the detection controller.

In this aspect, the leak amount sensor lines may comprise a leak amount film sensor and an extension line, and one end of each of the leak amount film sensor and the extension line may be connected to the detection controller, and the other end of the leak amount film sensor and the other end of the extension line may be terminated so as to be connected to each other.

In this aspect, the leak amount film sensor and the extension line may be attached to an outer surface of the leak sensing cable.

Another aspect of the present invention provides a leak detection system having power and communication lines, comprising a leak sensing cable having sensor lines for sensing a leak, at least one detection controller connected to the sensor lines to detect a leak position signal, and a master controller receiving the detected leak position signal from the detection controller, wherein the leak sensing cable includes the power and communication lines that supply power to the detection controller via the master controller and transmit the leak position signal from the detection controller to the master controller, and a common line wired to form a closed circuit of the master controller and the detection controller along with the power and communication lines.

In this aspect, the power and communication lines and the common line may be embedded in the leak sensing cable, and may be connected to the master controller and the detection controller.

In this aspect, the power and communication lines may comprise a positive (+) power and communication line and a negative (−) power and communication line.

In this aspect, the at least one detection controller may comprise two or more detection controllers, and the detection controllers may be respectively connected to the sensor lines.

In this aspect, the sensor lines may comprise two pairs of leak detection lines each pair comprising a single detection line and a single extension line, and one end of each of the detection lines and the extensions may be connected to the detection controllers, and the other end thereof may be terminated so that the detection lines and the extension lines of respective pairs of leak detection lines are connected to each other.

In this aspect, the leak detection system may further comprise a computer for storing the leak position signal received by the master controller and displaying it on a monitor.

In this aspect, the leak detection system may further comprise an alarm for informing of reception of the leak position signal by the master controller when the leak position signal is transmitted to the master controller.

In this aspect, the leak sensing cable may further include leak amount sensor lines for sensing a leak amount, the detection controller may be connected to the leak amount sensor lines to further detect a leak amount signal, and the master controller may further receive the detected leak amount signal from the detection controller.

In this aspect, the leak amount sensor lines may comprise a leak amount film sensor and an extension line, and one end of each of the leak amount film sensor and the extension line may be connected to the detection controller, and the other end of the leak amount film sensor and the other end of the extension line may be terminated so as to be connected to each other.

In this aspect, the leak amount film sensor and the extension line may be attached to an outer surface of the leak sensing cable.

BRIEF DESCRIPTION OF THE DRAWINGS

The features and advantages of the present invention will be more clearly understood from the following detailed description taken in conjunction with the accompanying drawings, in which.

DETAILED DESCRIPTION OF THE INVENTION

Figure 1:
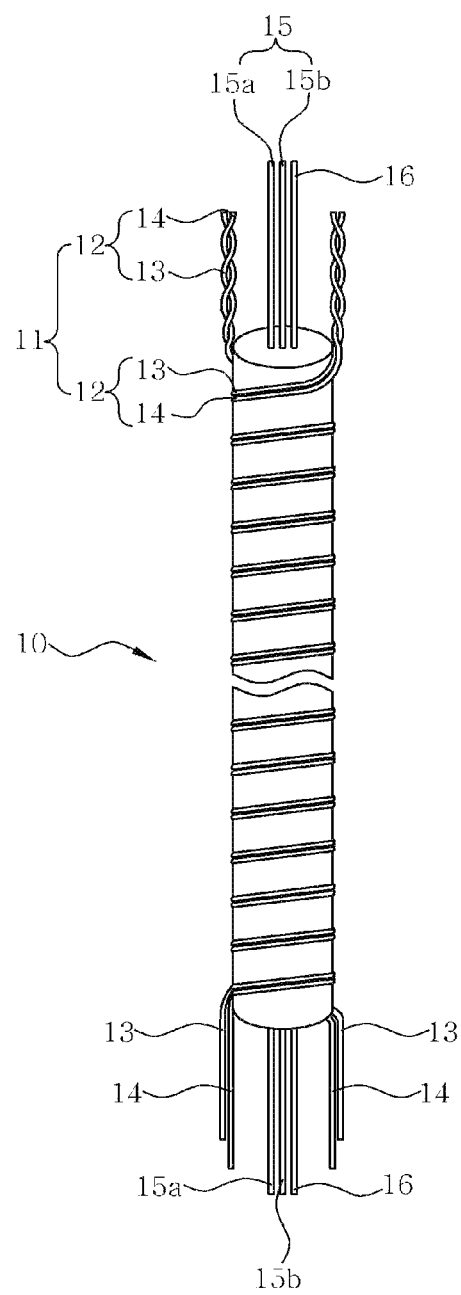
FIGS. 1 and 2 are views showing a leak sensing cable.

Hereinafter, embodiments of the present invention of a leak detection system having power and communication lines will be described in detail while referring to the accompanying drawings. Throughout the drawings, the same reference numerals are used to refer to the same or similar elements.

FIG. 1 shows the leak sensing cable of a leak detection system having power and communication lines according to the present invention.

The leak sensing cable 10 includes sensor lines 11 that are attached to the outer surface thereof so as to come into contact with the outside and so sense a leak, and power and communication lines 15 are embedded in the leak sensing cable 10.

The sensor lines 11 comprise two pairs of leak detection lines 12 each pair having a single detection line 13 and a single extension line 14.

The detection lines 13 are made of a conductive polymer which detects a variety of liquids such as a liquid, an acidic or alkaline solution, oil and so on and has a predetermined resistance in proportion to the length.

When the variety of liquids are detected at specific positions of the detection lines 13 due to leaking water or oil, there occurs a difference in potential (voltage) because of an electrochemical reaction between two detection lines 13 made of a conductive polymer (which is particularly a conductive polymer able to be penetrated by a variety of liquids). Thereby, changes in resistance and a difference in feedback current to detection controllers 30 connected to the sensor lines 11 are controlled by the detection controllers 30, and are calculated, thus determining the accurate leak position (reference to conventional leak sensing cables such as Model Nos. TT1000, TT3000, TT7000, etc.).

As such, one end of each of the detection lines 13 and the extension lines 14 of the leak detection lines 12 is connected to the detection controllers 30, and the other end thereof is terminated so that the detection lines 13 and the extension lines 14 of respective pairs of leak detection lines 12 are connected to each other (so as to make one line). The detection lines 13 have their own resistance and should be subjected to termination resistance treatment.

The power and communication lines 15 are used for providing the power and communication necessary for the leak detection system, and comprise a positive (+) power and communication line 15a used as a positive (+) line of power and a positive (+) line of communication, and a negative (−) power and communication line 15b used as a negative (−) line of power and a negative (−) line of communication.

The power and communication lines 15 function to supply power to the detection controllers 30, and to transfer leak position information to the master controller 20 from the detection controllers 30 that has been obtained from the sensor lines 11.

The power and communication lines 15 are preferably embedded in the leak sensing cable having four sensor lines 11 attached to the outer surface thereof to sense a leak.

The leak detection system having power and communication lines according to the present invention is exemplified by a leak detection system 100 having power and communication lines in a closed loop (FIGS. 3 and 5) in which the power and communication lines 15 are connected to the detection controllers 30 using the master controller 20 as a start point and an end point so that the final detection controller 30 among the detection controllers 30 is returned toward the master controller 20, and a leak detection system 200 having power and communication lines in a series (FIGS. 7 and 10) in which detection controllers 30 are disposed in a series relative to the master controller 20.

As such, in the case of the leak detection system 200 having power and communication lines in a series (FIGS. 7 and 10), a common line 16, in addition to the power and communication lines 15, is further contained in the leak sensing cable 10.

The common line 16 enables the power and communication lines 15 to function as communication lines. In the leak detection system 200 having power and communication lines in a series, the common line 16 connects the final detection controller 30 to the master controller 20 along with the positive (+) power and communication line 15a, which is specified later.

Figure 2:
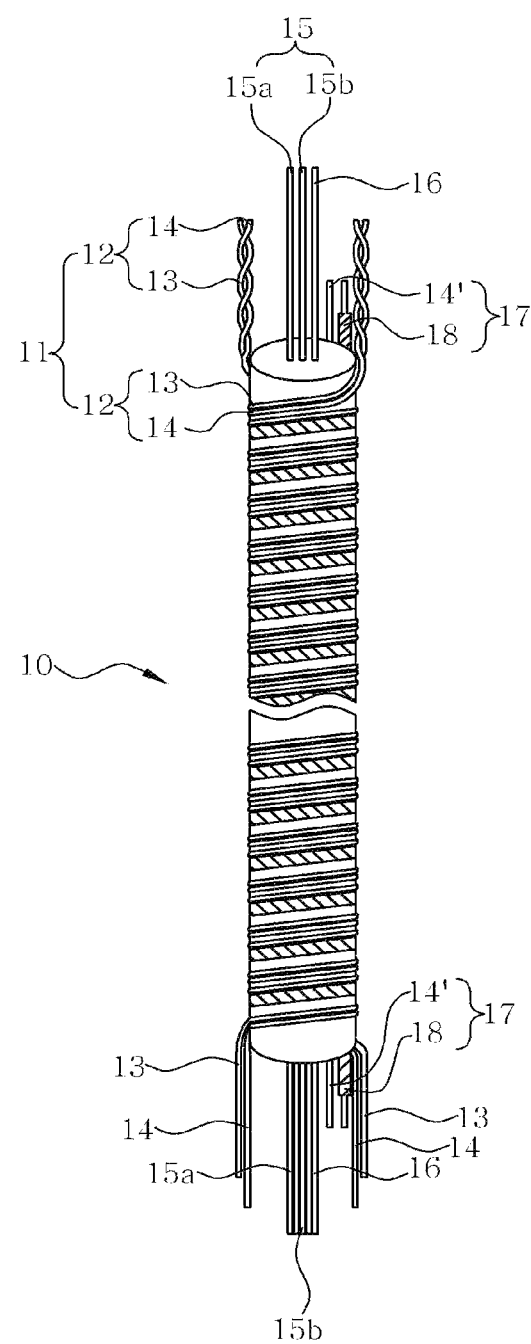

FIG. 2 shows the leak sensing cable of a leak detection system having power and communication lines according to the present invention, in which the leak sensing cable 10 further includes leak amount sensor lines 17 for sensing a leak amount resulting from a variety of liquids leaking.

The leak amount sensor lines 17 comprise a leak amount film sensor 18 and an extension line 14' to measure the leak amount.

The leak amount film sensor 18 may include a humidity fiber (or film) sensor which is typically attached to the front window of a vehicle, and the extension line 14' is connected to the detection controllers 30 along with the leak amount film sensor 18 so that the leak amount signal sensed by the leak amount film sensor 18 is returned to the detection controllers 30.

As such, the leak amount sensor lines 17 may be attached to the outer surface (preferably the outer surface between respective leak detection lines 12) of the leak sensing cable 10 along with the sensor lines 11.

The leak amount sensor lines 17 including the leak amount film sensor 18 and the extension line 14' are connected to the detection controllers 30 in such a manner that one end of each of the leak amount film sensor 18 and the extension line 14' is connected to the detection controllers 30 and the other end of the leak amount film sensor 18 and the other end of the extension line 14' are connected to each other and terminated (FIGS. 5 and 10), according to the principle described for the above sensor lines 11.

Figure 3:
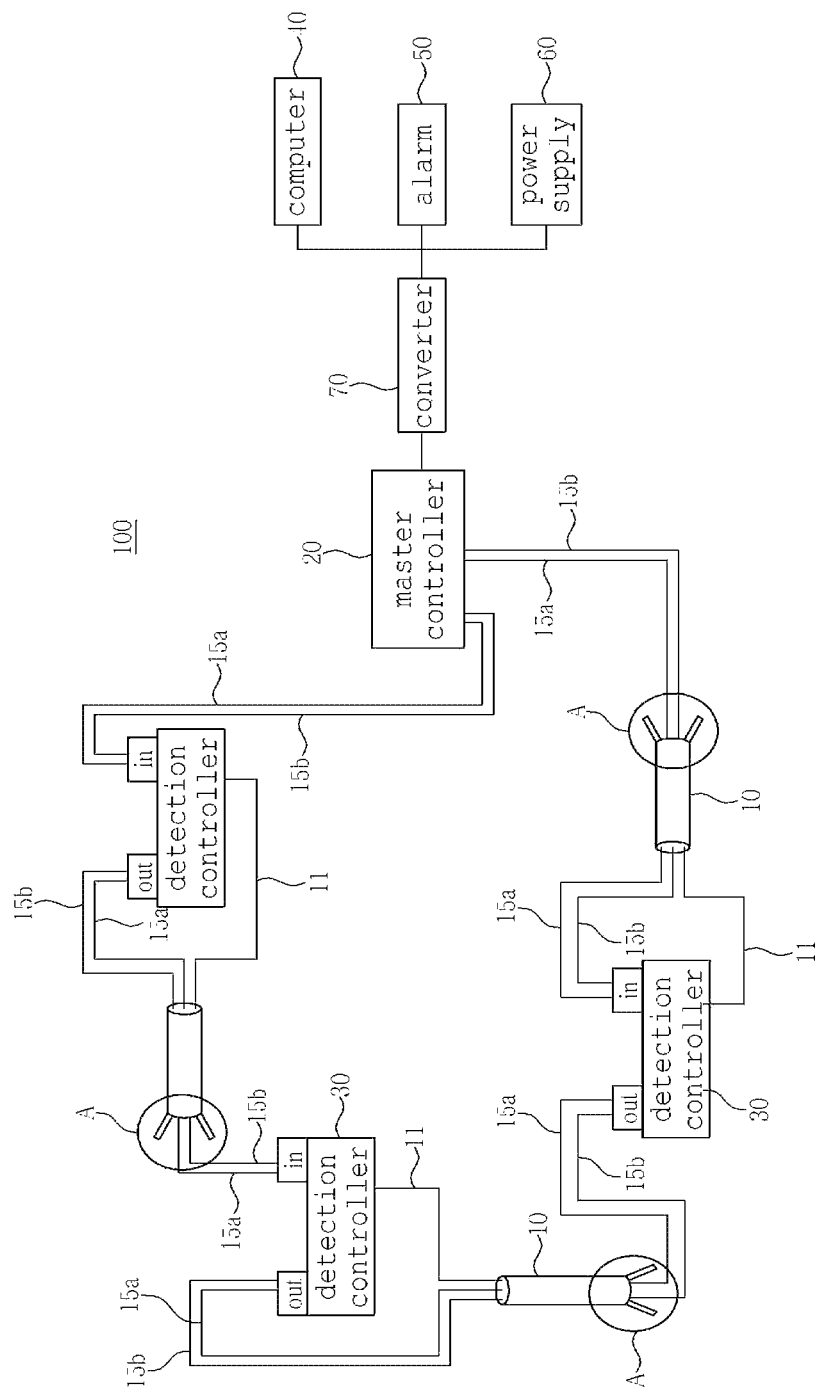
FIG. 3 is a block diagram showing a leak detection system having power and communication lines according to an embodiment of the present invention.
Figure 4:
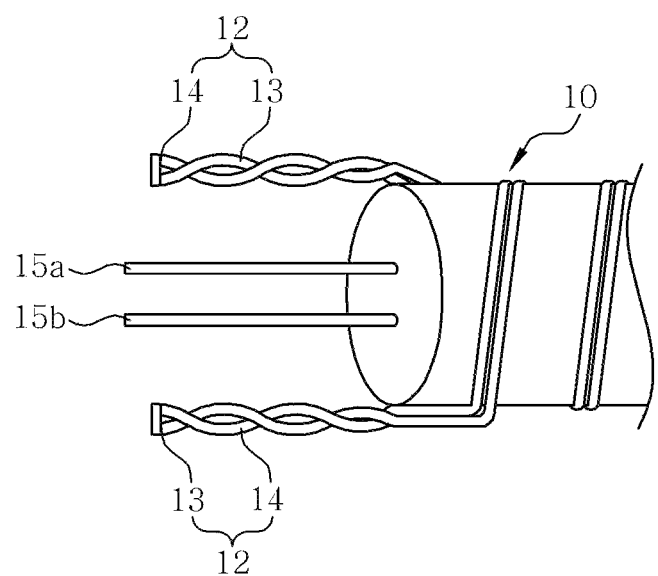
FIG. 4 is an enlarged view of the portion 'A' of FIG. 3.

FIG. 3 is a block diagram showing a leak detection system having power and communication lines in a closed loop according to a preferred embodiment of the present invention, and FIG. 4 is an enlarged view of the portion 'A' of FIG. 3.

The leak detection system 100 having power and communication lines in a closed loop comprises a leak sensing cable 10 having sensor lines 11 for sensing a leak, detection controllers 30 connected to the sensor lines 11 to detect a leak position signal, and a master controller 20 receiving the detected leak signal from the detection controllers 30. This leak detection system has power and communication lines 15 which are connected to supply power to the detection controllers 30 via the master controller 20 and to transmit the leak signal detected by the detection controllers 30 to the master controller 20.

The power and communication lines 15 are embedded inside the leak sensing cable 10 and are wired to connect the master controller 20 and the detection controllers 30.

The power and communication lines 15 comprise a positive (+) power and communication line 15a and a negative (−) power and communication line 15b.

As shown in FIG. 3, the power and communication lines 15 connect the master controller 20 to the detection controllers 30 and are returned to the master controller 20 from the final detection controller 30 thus forming a closed loop.

As such, the detection controllers 30 are connected to the sensor lines 11 attached to the leak sensing cable 10, and function to detect the leak position signal sensed by the sensor lines 11 so that such a signal is transmitted to the master controller 20 via the power and communication lines 15.

The master controller 20 transmits the leak position signal to a computer 40, an alarm 50, etc., from the detection controllers 30.

The master controller 20 receives a state information signal (about erroneous operation or failure of the detection controllers 30) of the detection controllers 30 via the power and communication lines 15 and transmits such an information signal to the computer 40.

The computer 40 functions to store the leak position in response to the leak position signal transmitted from the master controller 20 or the state information of the corresponding detection controller 30 in response to the state information signal, using mmi programs, and to display it on a displayer (not shown) such as a monitor.

The alarm 50 produces an alarm message (including sound or light) that informs the reception of the leak position signal by the master controller 20 when the leak position signal is transmitted to the master controller 20.

As such, the master controller 20 further includes a power supply 60 that supplies power to the detection controllers 30 or the detection controllers 30 and the master controller 20.

The energy (power) transferred from the power supply 60 to the master controller 20 is supplied to the detection controllers 30 via the power and communication lines 15.

As such, a converter 70 may be further provided between the master controller 20 and the computer 40, the alarm 50, and the power supply 60, so that a communication protocol such as the leak position signal or the like transmitted from the master controller 20 is converted into a signal able to be read by the computer or the power of the power supply 60 is converted into power able to be used by the master controller 20 or the detection controllers 30.

The sensor lines 11 of the leak sensing cable 10 comprise two pairs of leak detection lines 12 each pair including a single detection line 13 and a single extension line 14.

The sensor lines 11 include a total of four lines comprising two detection lines 13 and two extension lines 14, among which two leak detection lines 12 in which the single detection line 13 and the single extension line 14 make a pair are wound in the form of a spiral on the outer surface of the leak sensing cable 10.

The sensor lines 11 of the leak sensing cable 10 are connected to the detection controllers 30 in such a manner that one end of each of the sensor lines 11 (one end of each of the two pairs of leak detection lines 12) is connected to the detection controllers 30 so as to detect the leak position signal by the detection controllers 30, and the other end thereof is terminated so that the detection lines 13 and the extension lines 14 of respective pairs of leak detection lines 12 are connected (so as to form one line) (the portion 'A' of FIG. 3 and FIG. 4).

The leak detection system 100 having power and communication lines in a closed loop includes two or more detection controllers 30, and these detection controllers 30 respectively connected to the sensor lines 11 of the leak sensing cable 10.

The sensor lines 11 of the leak sensing cable 10 are connected to respective detection controllers 30 and the connection structure of the sensor lines 11 of the leak sensing cable 10 is as above.

As such, the positive power and communication line 15a and the negative power and communication line 15b of the power and communication lines 15 are connected to all the detection controllers 30 using the master controller 20 as the start point and the end point thus forming a closed loop as mentioned above, and are embedded in and connected to the leak sensing cable 10.

Figure 5:
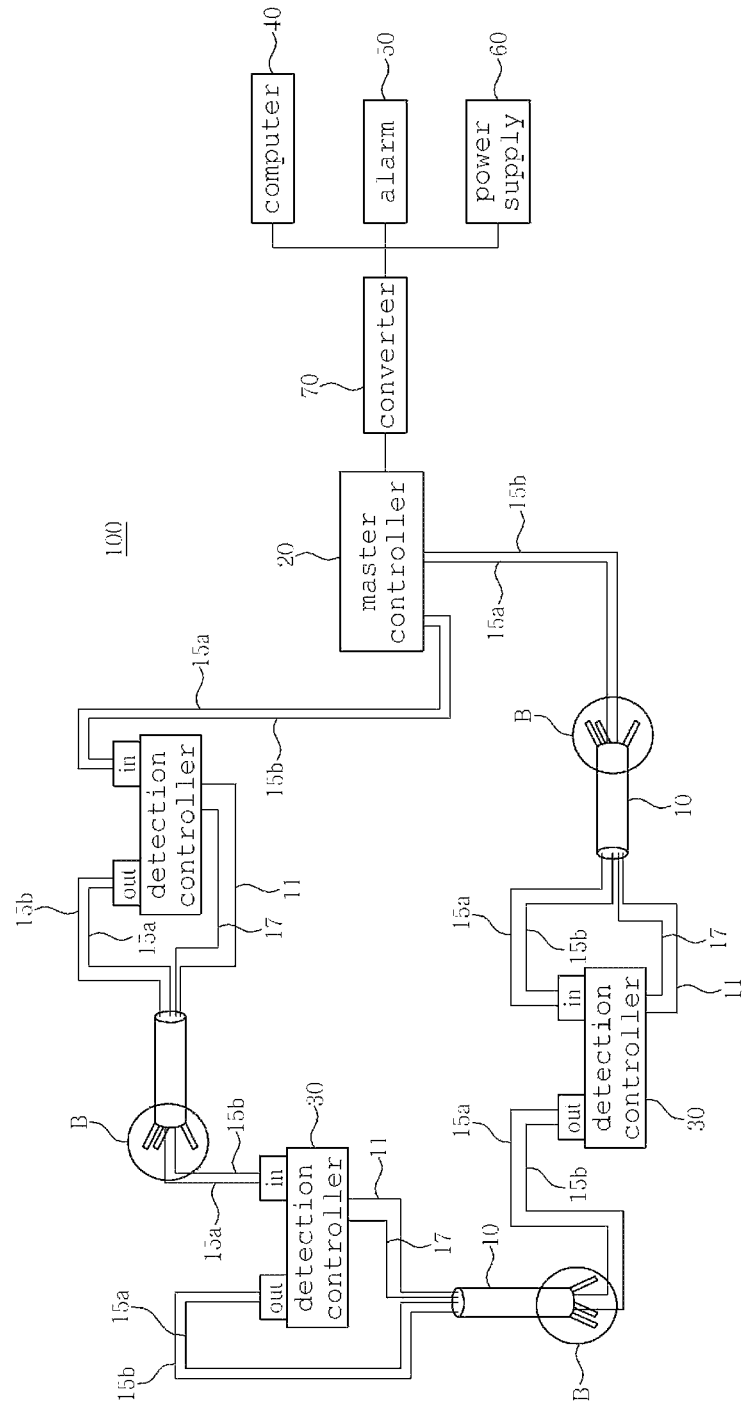
FIG. 5 is a block diagram showing a leak detection system having power and communication lines, in which the leak sensing cable of FIG. 3 further includes leak amount sensor lines.
Figure 6:
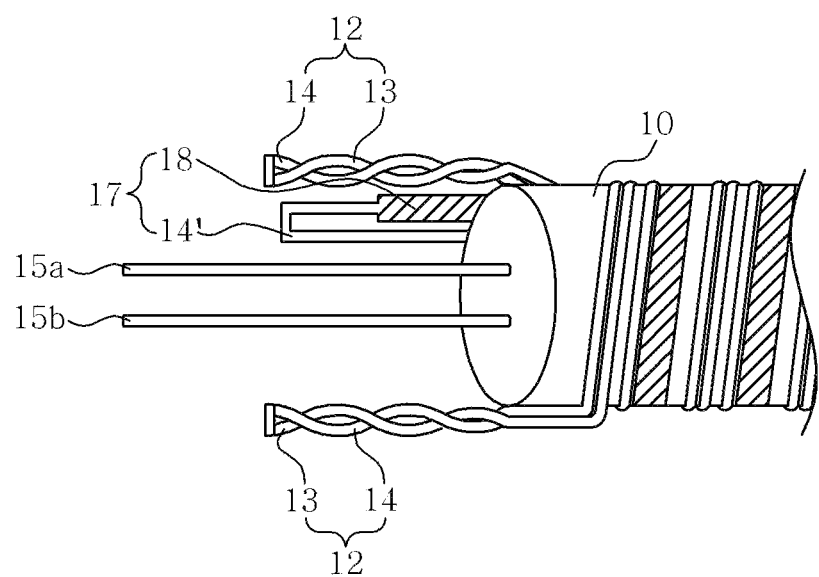
FIG. 6 is an enlarged view of the portion 'B' of FIG. 5.

FIG. 5 shows a leak detection system 100 having power and communication lines in a closed loop, in which the leak sensing cable 10 of FIG. 3 further includes leak amount sensor lines 17, and FIG. 6 is an enlarged view of the portion 'B' of FIG. 5.

The leak amount sensor lines 17 comprise a leak amount film sensor 18 and an extension line 14', and one end of each of the leak amount sensor 18 and the extension line 14' is further connected to the detection controllers 30 along with the sensor lines 11, and the other end thereof is wired so as to form one line as was the case for the sensor lines 11 (FIGS. 5 and 6).

As such, the detection controllers 30 further detect the leak amount signal sensed by the leak amount sensor lines and further transmit it to the master controller 20, and the master controller 20 transmits this transmitted leak amount signal to the computer 40, the alarm 50, etc.

The computer 40 stores the information about the leak amount along with the information about the leak position, and displays it, and the alarm 50 may display the leak amount in addition to the fact that the leak was detected.

Figure 7:
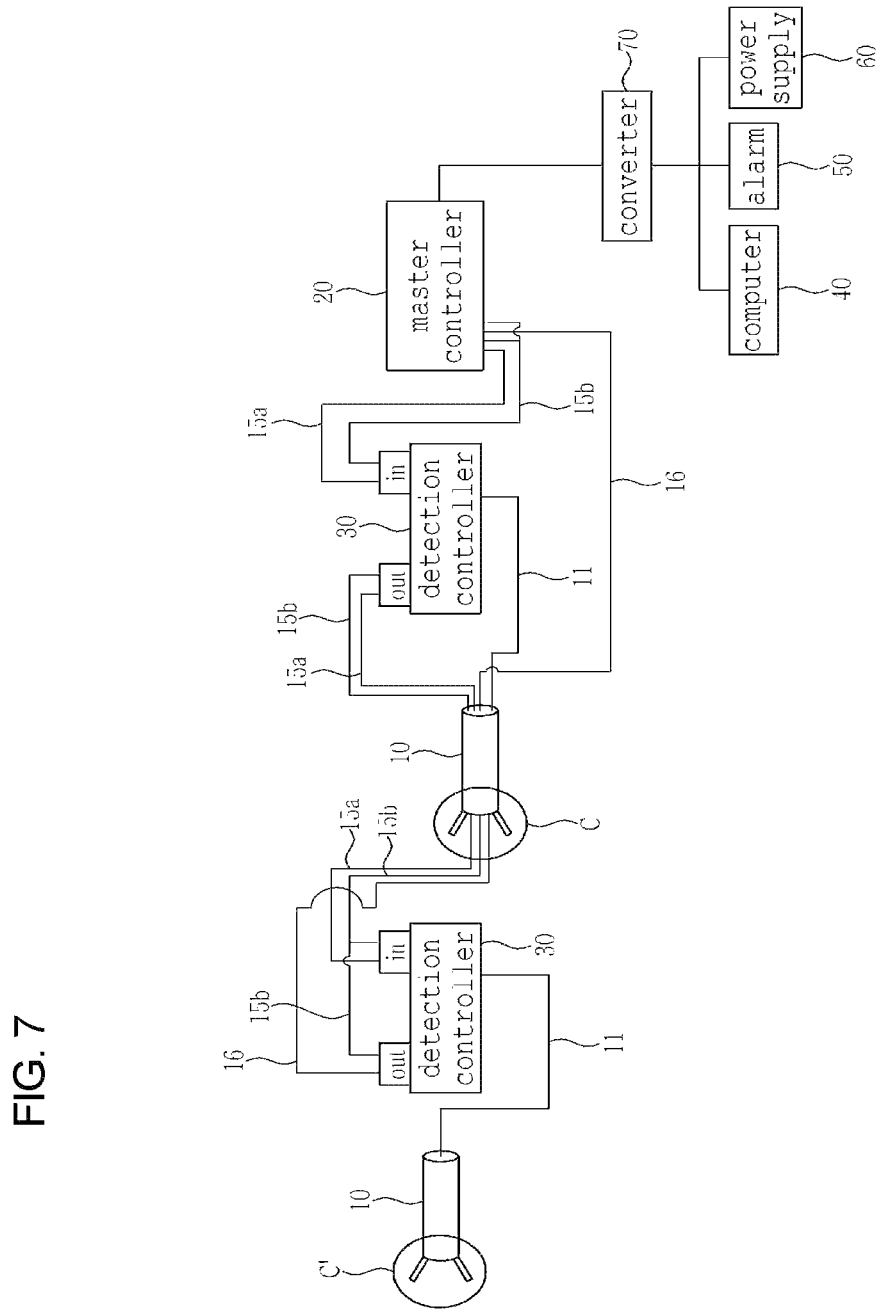
FIG. 7 is a block diagram showing a leak detection system having power and communication lines according to another embodiment of the present invention.
Figure 8:
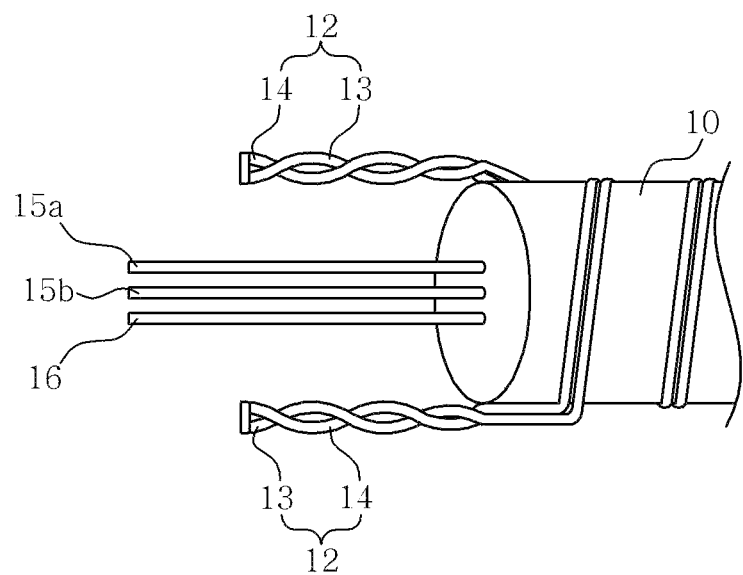
FIGS. 8 and 9 are enlarged views of the portions 'C' and 'C'' of FIG. 7, respectively.
Figure 9:
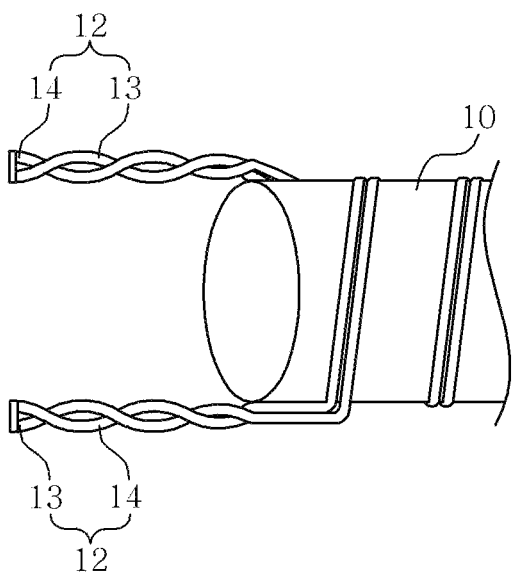

FIG. 7 is a block diagram showing a leak detection system having power and communication lines in a series according to a preferred embodiment of the present invention, and FIG. 8 is an enlarged view of the portion 'C' of FIG. 7 and FIG. 9 is an enlarged view of the portion 'C'' of FIG. 7.

The leak detection system 200 having power and communication lines in a series comprises a leak sensing cable 10 having sensor lines 11 for sensing a leak, detection controllers 30 connected to the sensor lines 11 to detect a leak position signal, and a master controller 20 receiving the detected leak position signal from the detection controllers 30. Also, the leak detection system 200 includes power and communication lines 15 that supply power to the detection controllers 20 via the master controller 20 and transmit the leak position signal detected by the detection controllers 30 to the master controller 20, and a common line 16 connected to form a closed circuit of the master controller and the detection controller along with the power and communication lines 15.

The configuration and the connection structure of the power and communication lines 15 and the sensor lines 11 are the same as in the above leak detection system having power and communication lines in a closed loop.

As shown in FIG. 7, the common line 16 of the leak detection system 200 having power and communication lines in a series allows the power and communication lines 15 to function as communication lines for transmitting the leak position signal from the detection controllers 30 to the master controller 20, and connects the final detection controller 30 to the master controller 20 along with the positive (+) power and communication line 15a in the leak detection system 200 having power and communication lines in a series.

The common line 16 is embedded in the leak sensing cable 10 along with the negative (−) power and communication line 15b and connects the output terminal (out) of the final detection controller 30 to the master controller 20, thereby forming a closed circuit in which the power and communication lines 15 may function as the communication line.

In the leak detection system 200 having power and communication lines in a series, the common line 16 is embedded in the leak sensing cable 10 along with the power and communication lines 15 as shown in FIG. 7, and is connected to form a closed circuit, but there is no need to embed the power and communication lines 15 and the common line 16 in the leak sensing cable 10 between the final detection controller 30 and the master controller 20.

The structure in which the sensor lines 11 of the leak sensing cable 10 are connected to the detection controllers 30 is a wired structure the same as in the leak detection system 100 having power and communication lines in a closed loop.

Also the leak detection system 200 having power and communication lines in a series may include two or more detection controllers 30 the same as the leak detection system 100 having power and communication lines in a closed loop.

In this case, the detection controllers 30 are respectively connected to the sensor lines 11 of the leak sensing cable 10, and the power and communication lines 15 and the common line 16 are connected as shown in FIG. 7.

The common line 16 connects the output terminal (out) of the final detection controller 30 among the detection controllers 30 to the master controller 20 along with the positive (+) power and communication line 15a and the negative power and communication line 15b to thus form a closed circuit, and thereby enables the power and communication lines 15 to function as communication lines that transmit the leak position signal or the like detected by respective detection controllers 30 to the master controller 20.

The leak detection system 200 having power and communication lines in a series may further include a computer 40, an alarm 50, a power supply 60, a converter 70, etc., which are connected to the master controller 20, which was described for the leak detection system 100 having power and communication lines in a closed loop.

Figure 10:
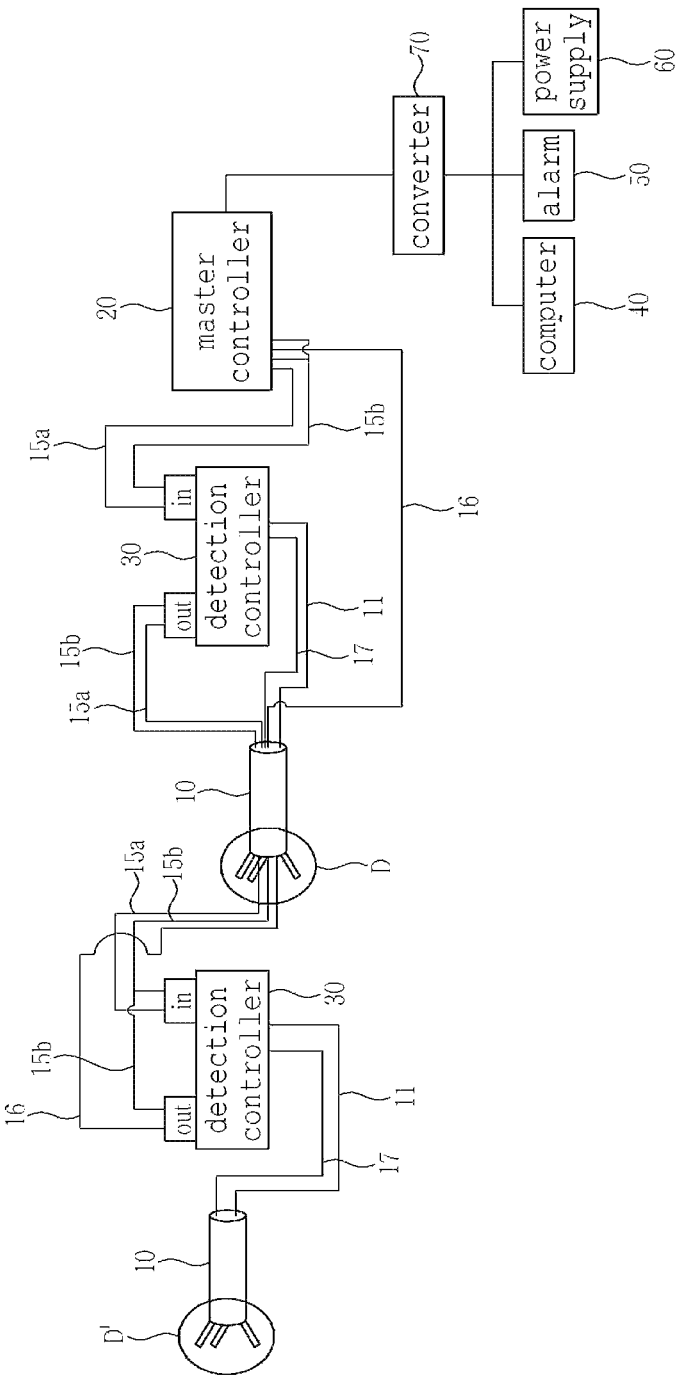
FIG. 10 is a block diagram showing a leak detection system having power and communication lines, in which the leak sensing cable of FIG. 7 further includes leak amount sensor lines.
Figure 11:
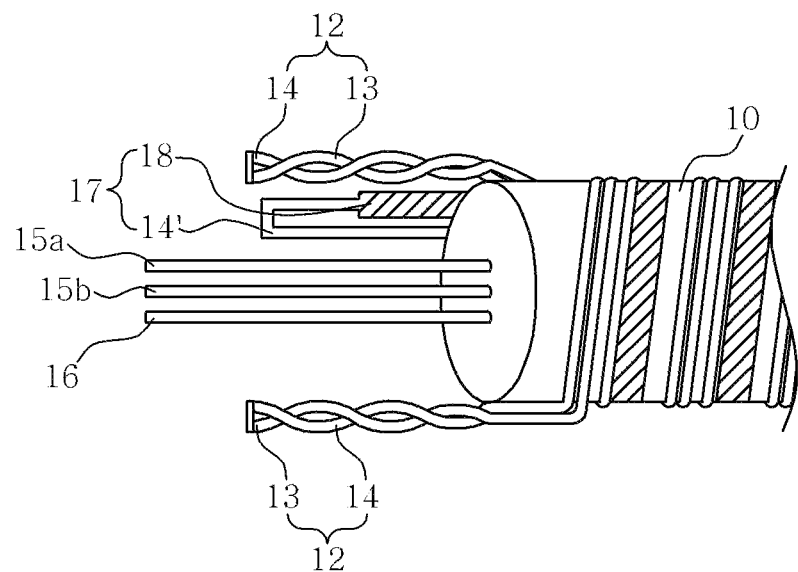
FIGS. 11 and 12 show enlarged views of the portions 'D' and 'D'' of FIG. 10, respectively.
Figure 12:
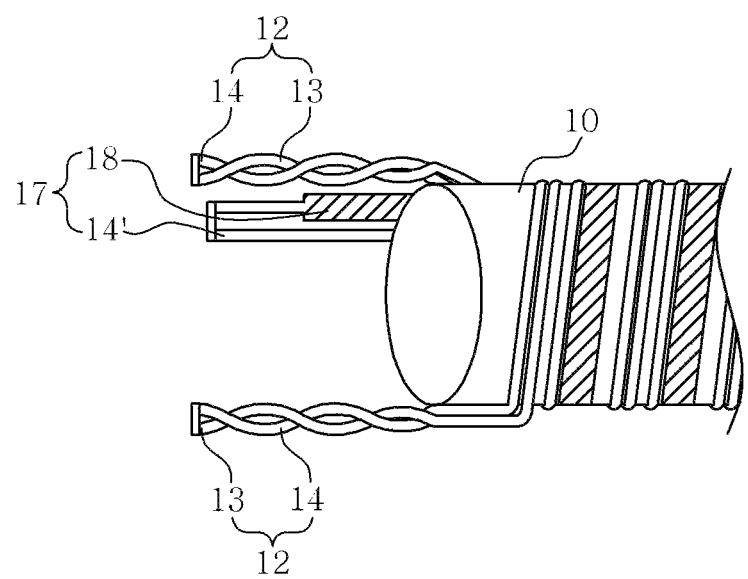

FIG. 10 shows a leak detection system 200 having power and communication lines in a series in which the leak sensing cable 10 of FIG. 7 further includes leak amount sensor lines 17, and FIG. 11 is an enlarged view of the portion 'D' of FIG. 10 and FIG. 12 is an enlarged view of the portion 'D'' of FIG. 10.

The leak amount sensor lines 17 comprise a leak amount film sensor 18 and an extension line 14', and one end of each of the leak amount film sensor 18 and the extension line 14' is connected to the detection controllers 30 along with the sensor lines 11, and the other end thereof is connected so as to form one line as the sensor lines 11 did to thereby form a wired structure (FIGS. 10 to 12).

The detection controllers 30 further detect the leak amount signal sensed by the leak amount sensor lines to further transmit it to the master controller 20, and the master controller 20 transmits the above leak amount signal to the computer 40, the alarm 50, etc.

The computer 40 stores the information about the leak amount along with the information about the leak position and displays it on a monitor, etc., and the alarm 50 displays the leak amount in addition to the fact that the leak was detected.

The leak detection system having power and communication lines according to the present invention may be installed to hot water supply pipes or cooling water supply pipes of regional heating corporations, semiconductor plants, museums, telephone offices, general buildings, etc., in order to detect the leak.

The master controller 20 may typically manage about 100 detection controllers 30 and enables leak detection over a maximum distance of 24 km.

As the leak detection system having power and communication lines according to the present invention, either the leak detection system 100 having power and communication lines in a closed loop or the leak detection system 200 having power and communication lines in a series may be installed depending on the form and the characteristics of a region that requires the installation of a leak detection system.

As described hereinbefore, the present invention provides a leak detection system having power and communication lines. \ According to the present invention, a leak sensing cable further includes power and communication lines, and thereby the leak detection system has the power and communication lines able to transmit a leak position signal between detection controllers and a master controller while supplying power to the detection controllers and the master controller.

Also according to the present invention, the leak detection system having power and communication lines can be easily installed depending on the characteristics of a region that requires the installation of a leak detection system.

Also according to the present invention, the leak detection system has power and communication lines able to transmit a leak position signal and a leak amount signal between the detection controllers and the master controller while supplying power to the detection controllers and the master controller.

Although the embodiments of the present invention have been disclosed for illustrative purposes, those skilled in the art will appreciate that a variety of different modifications, additions and substitutions are possible, without departing from the scope and spirit of the invention as disclosed in the accompanying claims. Accordingly, such modifications, additions and substitutions should also be understood as falling within the scope of the present invention.

What is claimed is:

1. A leak detection system having power and communication lines, comprising a leak sensing cable having sensor lines for sensing a leak, at least one detection controller connected to the sensor lines to detect a leak position signal, and a master controller receiving the detected leak position signal from the detection controller, wherein the leak sensing cable includes the power and communication lines that are wired to supply power to the detection controller via the master controller and to transmit the leak position signal from the detection controller to the master controller, and a computer for storing the leak position signal received by the master controller and displaying it on a monitor is provided, wherein the power and communication lines are embedded in the leak sensing cable and are connected to the master controller and the detection controller, and wherein the power and communication lines comprise a positive (+) power and communication line and a negative (−) power and communication line.

2. The leak detection system of claim 1, wherein the positive power and communication line and the negative power and communication line are connected to the detection controller using the master controller as a start point and an end point thus forming a closed loop.

3. The leak detection system of claim 1, wherein the at least one detection controller comprises two or more detection controllers, and the detection controllers are respectively connected to the sensor lines.

4. The leak detection system of claim 3, wherein the sensor lines comprise two pairs of leak detection lines each pair comprising a single detection line and a single extension line, and one end of each of the detection lines and the extension lines is connected to the detection controllers, and the other end thereof is terminated so that the detection lines and the extension lines of respective pairs of leak detection lines are connected to each other.

5. The leak detection system of claim 1, further comprising an alarm for informing of reception of the leak position signal by the master controller when the leak position signal is transmitted to the master controller.

6. A leak detection system having power and communication lines, comprising a leak sensing cable having sensor lines for sensing a leak, at least one detection controller connected to the sensor lines to detect a leak position signal, and a master controller receiving the detected leak position signal from the detection controller, wherein the leak sensing cable includes the power and communication lines that are wired to supply power to the detection controller via the master controller and to transmit the leak position signal from the detection controller to the master controller, and a computer for storing the leak position signal received by the master controller and displaying it on a monitor is provided, wherein the leak sensing cable further includes leak amount sensor lines for sensing a leak amount, the detection controller is connected to the leak amount sensor lines to further detect a leak amount signal, and the master controller further receives the detected leak amount signal from the detection controller.

7. The leak detection system of claim 6, wherein the leak amount sensor lines comprise a leak amount film sensor and an extension line, and one end of each of the leak amount film sensor and the extension line is connected to the detection controller, and the other end of the leak amount film sensor and the other end of the extension line are terminated so as to be connected to each other.

8. The leak detection system of claim 7, wherein the leak amount film sensor and the extension line are attached to an outer surface of the leak sensing cable.

9. A leak detection system having power and communication lines, comprising a leak sensing cable having sensor lines for sensing a leak, at least one detection controller connected to the sensor lines to detect a leak position signal, and a master controller receiving the detected leak position signal from the detection controller, wherein the leak sensing cable includes the power and communication lines that supply power to the detection controller via the master controller and transmit the leak position signal from the detection controller to the master controller, and a common line wired to form a closed circuit of the master controller and the detection controller along with the power and communication lines.

10. The leak detection system of claim 9, wherein the power and communication lines and the common line are embedded in the leak sensing cable, and are connected to the master controller and the detection controller.

11. The leak detection system of claim 10, wherein the power and communication lines comprise a positive (+) power and communication line and a negative (−) power and communication line.

12. The leak detection system of claim 9, wherein the at least one detection controller comprises two or more detection controllers, and the detection controllers are respectively connected to the sensor lines.

13. The leak detection system of claim 12, wherein the sensor lines comprise two pairs of leak detection lines each pair comprising a single detection line and a single extension line, and one end of each of the detection lines and the extensions is connected to the detection controllers, and the other end thereof is terminated so that the detection lines and the extension lines of respective pairs of leak detection lines are connected to each other.

14. The leak detection system of claim 9, further comprising a computer for storing the leak position signal received by the master controller and displaying it on a monitor.

15. The leak detection system of claim 14, further comprising an alarm for informing of reception of the leak position signal by the master controller when the leak position signal is transmitted to the master controller.

16. The leak detection system of claim 9, wherein the leak sensing cable further includes leak amount sensor lines for sensing a leak amount, the detection controller is connected to the leak amount sensor lines to further detect a leak amount signal, and the master controller further receives the detected leak amount signal from the detection controller.

17. The leak detection system of claim 16, wherein the leak amount sensor lines comprise a leak amount film sensor and an extension line, and one end of each of the leak amount film sensor and the extension line is connected to the detection controller, and the other end of the leak amount film sensor and the other end of the extension line are terminated so as to be connected to each other.

18. The leak detection system of claim 17, wherein the leak amount film sensor and the extension line are attached to an outer surface of the leak sensing cable.

* * * * *